(12) United States Patent
Reed

(10) Patent No.: US 8,002,508 B2
(45) Date of Patent: Aug. 23, 2011

(54) PROTECTIVE COVER FOR FASTENERS

(75) Inventor: Larry Reed, Clackamas, OR (US)

(73) Assignee: Griptight Bolt Cover Co., Clackamas, OR (US)

( * ) Notice: Subject to any disclaimer, the term of this patent is extended or adjusted under 35 U.S.C. 154(b) by 423 days.

(21) Appl. No.: 12/286,035

(22) Filed: Sep. 26, 2008

(65) Prior Publication Data

US 2010/0080667 A1    Apr. 1, 2010

(51) Int. Cl.
F16B 37/14 (2006.01)

(52) U.S. Cl. .......................................... 411/431; 411/377

(58) Field of Classification Search .................. 411/429, 411/431, 372.5, 372.6, 373, 377
See application file for complete search history.

(56) References Cited

U.S. PATENT DOCUMENTS

| | | | |
|---|---|---|---|
| 1,254,514 A | | 1/1918 | Lehmann |
| 2,456,234 A | | 12/1948 | Young |
| 2,551,834 A | | 5/1951 | Ferguson |
| 2,726,009 A | | 12/1955 | Murdock, Sr., et. al. |
| 3,548,704 A | | 12/1970 | Kutryk |
| 4,400,123 A | * | 8/1983 | Dunegan ........................ 411/373 |
| 4,770,582 A | | 9/1988 | Junemann et al. |
| 4,907,929 A | | 3/1990 | Johnston Jr. |
| 5,028,093 A | * | 7/1991 | Nason ........................ 301/37.374 |
| 5,082,409 A | | 1/1992 | Bias |
| 5,129,770 A | | 7/1992 | Coleman |
| 5,180,266 A | | 1/1993 | Nolan et al. |
| 5,590,992 A | | 1/1997 | Russell |
| 5,624,218 A | * | 4/1997 | Dauwalter ........................ 411/87 |
| 5,752,795 A | * | 5/1998 | D'Adamo ........................ 411/429 |
| 6,135,691 A | | 10/2000 | Nadarajah et al. |
| 6,196,637 B1 | * | 3/2001 | Hou et al. ................ 301/37.375 |
| 6,238,158 B1 | | 5/2001 | Clements |
| 6,273,658 B1 | * | 8/2001 | Patterson et al. ............. 411/431 |
| 6,808,350 B1 | | 10/2004 | Tooman et al. |
| 2007/0022703 A1 | * | 2/2007 | Wolf et al. ........................ 52/698 |
| 2008/0152459 A1 | * | 6/2008 | Tooman et al. ............. 411/372.5 |

FOREIGN PATENT DOCUMENTS

| | | |
|---|---|---|
| AU | 2004100262 A4 | 4/2004 |
| DE | 3409947 | 9/1985 |
| DE | 44 39 567 A1 | 6/1995 |
| DE | 199 57 977 A1 | 6/2001 |
| GB | 2 203 510 A | 10/1988 |
| JP | 7042720 | 2/1995 |
| JP | 8068415 | 3/1996 |
| JP | 8128429 | 5/1996 |
| JP | 10037188 | 2/1998 |
| JP | 2001082433 | 3/2001 |
| JP | 2002097646 | 4/2002 |
| WO | WO 97/29289 | 8/1997 |

* cited by examiner

*Primary Examiner* — Flemming Saether

(74) *Attorney, Agent, or Firm* — Chernoff, Vilhauer, McClung & Stenzel, LLP

(57) ABSTRACT

A cover for the protection of large bolts and nuts, such as those used to secure wind turbine towers to foundations, from the weather. The protective cover may be tubular in shape and designed to be forcefully pressed over the bolt while ribs on the interior of the cover form an interference fit with the threading on the bolt. A larger portion located at the bottom of the cover protectively surrounds the nut and washer without touching either. The bottom can then seal against a surface, such as the surface of a mounting flange of a tower, to prevent the entry of corroding moisture.

17 Claims, 2 Drawing Sheets

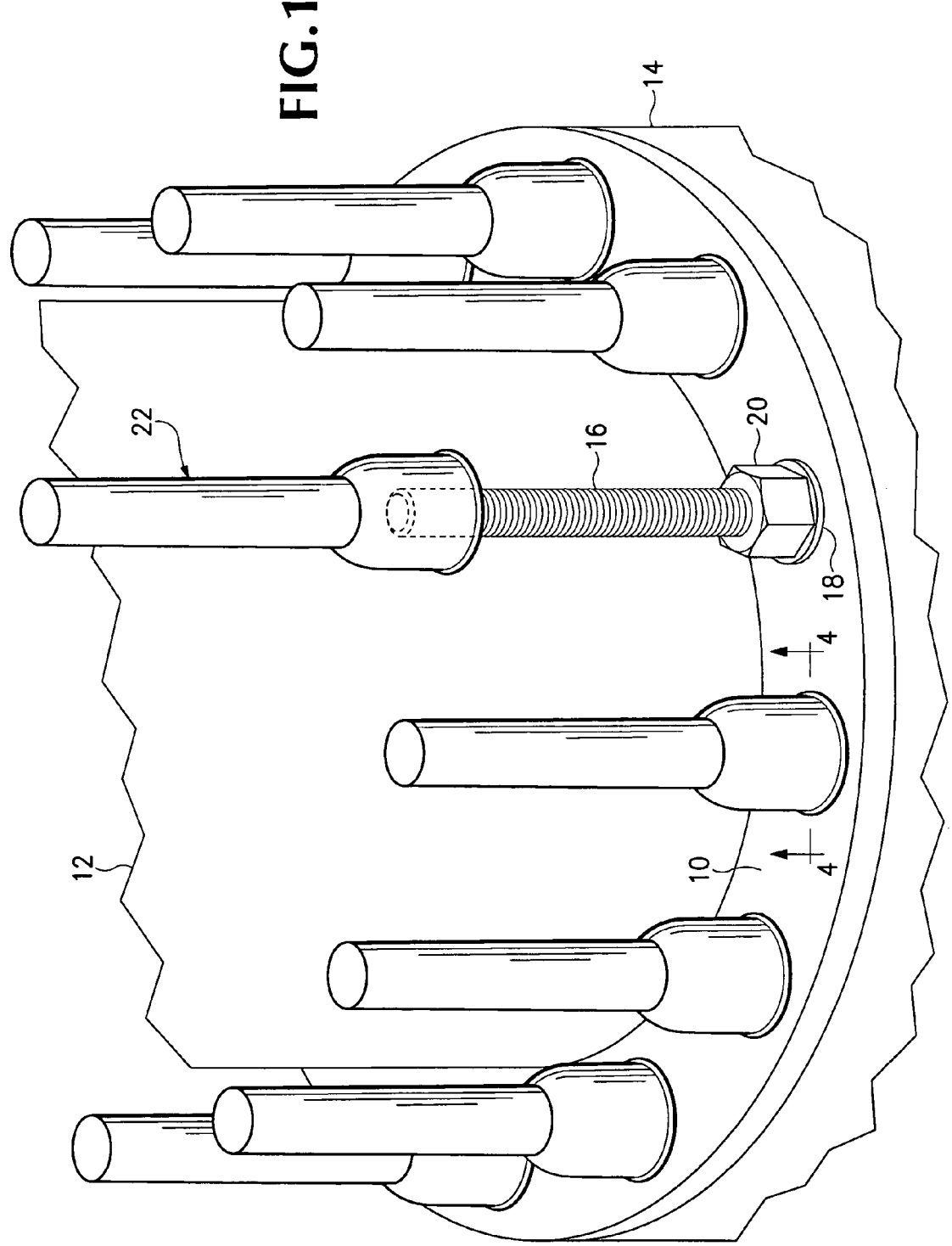

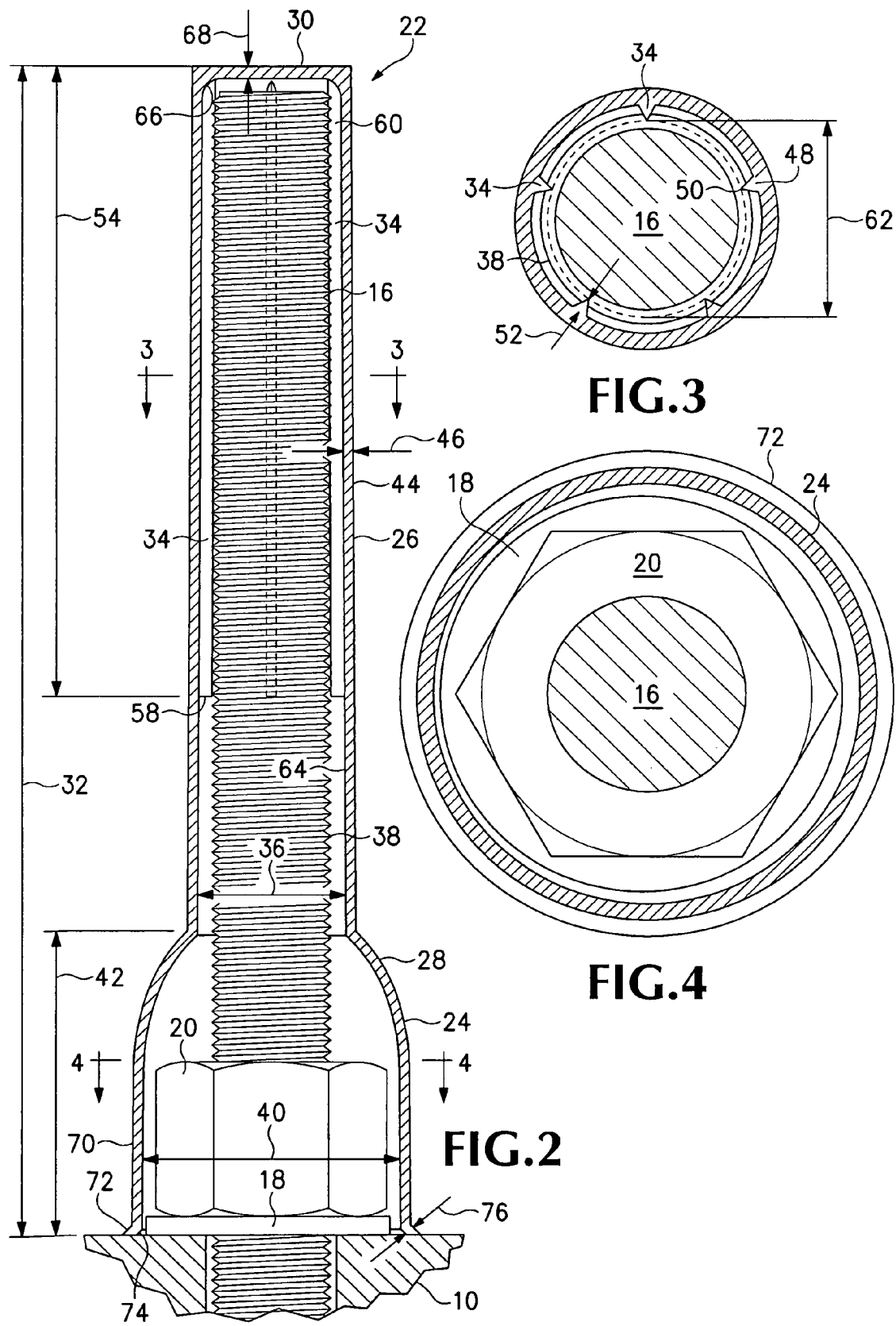

PROTECTIVE COVER FOR FASTENERS

BACKGROUND OF THE INVENTION

The present invention relates to protective covers for fasteners, and in particular, to covers for the exposed ends of large bolts and nuts found, for example, on the bases of wind turbine towers.

Wind turbine towers, which can be as tall as 250 feet, must withstand tremendous forces without excessive flexing, settling, or other movement which would impair the safe operation of the generator perched at the top. They are typically secured to concrete piers sunk into the ground, by threaded bolts which extend upward from those piers and through holes in a mounting flange found at the bottom of the tower. This mounting technique is both secure and reversible, allowing for relatively simple removal of damaged or obsolete towers.

To secure the benefit of reversibility, the bolts and their associated nuts and washers must be protected from the corrosion that comes from exposure to the weather. One means of doing this is to cover them with plastic shells designed to keep out the weather. Such shells include, for example, those of Tooman, U.S. Pat. No. 6,808,350. The Tooman shell remains held in place by gripping a nut tightly on all sides. In use, this shell has posed two practical problems. First, the Tooman shell is intolerant of errors during the assembly process. It cannot easily accommodate washers which are oversized or off-center, nor seal properly if more than one washer is used. This requires workers to use great care during assembly, given that errors are difficult to correct once the nuts have been fully tightened. Second, the close fit between the nut and the shell tends to create a capillary action which draws water into the shell. This effect is enhanced by cyclic changes in internal pressure caused by temperature and sun exposure variations during the day. Water in the shell leads to corrosion.

What is needed, then, is a device for the protection of nuts and bolts which is easily installed, is held firmly in place without causing capillary action, and is capable of accommodating minor variations in the fasteners to be protected.

SUMMARY OF THE INVENTION

The present disclosure provides an apparatus and a method that answer some of the aforementioned needs and shortcomings of the prior art, as defined in the appended claims.

In one embodiment, a substantially tubular cover surrounds an exposed portion of an elongate fastener, which may be a bolt, washer, and nut. The fastener is untouched by the cover except for a number of thin ribs which extend radially inward from the inner surface of the cover and form an interference fit with a portion of the fastener, securing the cover in place.

In one embodiment of the claimed method, the cover may first be placed loosely over the fastener to be protected, and then hammered or otherwise driven firmly into place to form an interference fit. The cover may made from a flexible plastic material so that when forced all the way into position, some residual elastic deformation presses a bottom flange against a surrounding surface such as the base of the wind turbine, forming a seal against water and dirt entry.

In one embodiment, the cover is large enough to accommodate deviations from normal specifications for the fastener to be protected, including for instance oversize washers, washers which are off-center, and the thickness of additional washers.

In one embodiment a lower portion of the cover may include a bell shape to accumulate and maintain an elastic force to urge the cover to remain in contact with a surrounding surface such as the base of a tower.

The foregoing and other features of the invention will be more readily understood upon consideration of the following detailed description taken in conjunction with the accompanying drawings.

BRIEF DESCRIPTION OF THE DRAWINGS

FIG. 1 is an isometric view showing the base of a wind turbine tower with the protective covers embodying the present invention in place over a set of tower mounting bolts.

FIG. 2 is a sectional view at an enlarged scale taken along line 2-2 of FIG. 1, depicting a single bolt and nut with one of the protective covers in place.

FIG. 3 is a sectional view taken along line 3-3 in FIG. 2, showing the upper part of the protective cover in contact with the bolt.

FIG. 4 is a sectional view taken along line 4-4 in FIG. 2, showing the lower part of the protective cover located surrounding, but not in contact with, the nut and washer shown in FIG. 2.

DETAILED DESCRIPTION OF EMBODIMENTS

Referring now to the drawings, FIG. 1 depicts the base 10 of a wind turbine tower 12 secured to a concrete foundation 14 and ready for use. This is accomplished by the use of large bolts 16 typically either 1¼ or 1⅜ inches in diameter. After the tower 12 is placed over the bolts 16, washers 18 and nuts 20 are attached to the bolts 16 to hold the tower in position. The bolts 16 typically have a length of several feet between the bottom of the foundation 14 and the base 10 of the tower 12 and project upward by a significant distance as a result of stretching under tension applied by the nuts 20. To protect the bolts 16 from the weather, and to prevent corrosion which would make adjustments or removal of the nuts 20 difficult, the exposed portions of the bolts 16 and nuts 20 are coated in water-repelling grease or other easily-applied protective coating material. Bolt covers 22 are then installed on the bolts 16 to keep out moisture and contaminants.

As shown in FIG. 2, the protective cover 22 includes a lower portion 24 connected with an upper portion 26 through a bell-shaped connecting part 28 of the lower portion 24. An upper end member 30 closes the top of the upper portion 26.

The bolt cover 22 can be constructed from a single piece of material for maximum weathertightness, as by molding it of a suitable plastic material. Preferably a moldable strong plastic that is resilient and able to withstand weather extremes and long continuous exposure to sunlight is used. For example, polypropylene with UV resistant additives is suitable and has ample strength and resiliency.

FIG. 2 shows the interaction of the cover 22 with the bolt 16, nut 20, and washer 18. The cover 22 has a length 32 and the upper portion 26 has a transverse dimension or diameter 36 that is large enough to avoid contact with the bolt 16 except along ribs 34, as shown also in FIG. 3. Because the bolts 16 to be protected are generally round, the upper portion 26 may conveniently be constructed to be approximately cylindrical, but it can be any shape which accommodates the bolt 16. The upper portion 26 may feature a slight taper, for example ⅛ inch decrease in diameter 36 of the upper portion 25 from bottom to top, both to ease extraction of the cover 22 from a mold used to manufacture it, and to offer a progressively tighter grip of the ribs 34 on the threads 38 of the bolt 16, as the cover 22 is pressed over the bolt 16. Thus the diameter 36 may be ⅛ inch greater near the bottom end of the ribs 12 than near the upper end member 30.

The lower portion 24 of the cover 22 has a transverse dimension or diameter 40 that is large enough to accommodate the nut 20 and washer 18 without touching either. The diameter 40 is also preferably large enough that, when the washer 18 is off-center or oversized, it can still be easily accommodated within the lower portion 24, as depicted in both FIG. 2 and FIG. 4. This may occur, for instance, when a washer 18 intended for use with a 1⅜ inch diameter bolt 16 is mistakenly placed over a 1¼ inch bolt, resulting in a potential eccentric displacement of about ¹⁄₁₆ inch off-center. The lower portion 24 may thus be designed to have a clearance around the nominally correct washer 18 greater than this amount by being constructed with diameter 40 as much as ¼ inch greater than that of the expected washer 18. The lower portion 24 also has a height 42 preferably tall enough to accommodate the nut 20 with ample clearance, even in the event that two washers 18 are used. Because of the enormous forces involved in securing turbine towers to their foundations, loosening nuts 20 to reposition or replace washers 18 is generally impractical, and thus the versatility imparted by a larger lower portion 24 offers a considerable advantage during installation of the protective cover 22. In addition, a loose fit around the bolt 16 and nut 20 avoids drawing water and contaminants into the cover by capillary action.

The lower portion 24 and upper portion 26 of the cover 22 are defined primarily by a wall 44 whose thickness 46 is sufficient to withstand the forces of being driven into place on a bolt 16. For example, the thickness 46 may be 0.125 inch in a cover 22 whose length 32 is approximately 15 inches. The ribs 34 protrude radially inward from the inner surface of the wall 44 to contact the bolt 16. The ribs 34 have a cross-section shape which is broad at its root 48, where the rib 34 is based on the wall 44, and which tapers radially to a narrow portion 50, which may form a relatively sharp edge. This cross-section may thus be approximately triangular, with an inward radial protrusion 52, or height, of ⅛ inch. The ribs 34 may maintain the same cross-section shape and size over their length 54, and therefore the diameter 62 of a circle tangent to the edges 50 can follow the taper of the upper portion 26. In this way they cause an interference fit over the bolt 16 which grows progressively firmer as the cover is urged into position so that the bolt 16 extends closer to the upper end member 30. A lower portion 58 of the ribs 34 may only contact the bolt 16 near the edges 50 of the ribs 34, but at an upper end 60 of the ribs 34, the bolt 16 will have been forced closer to the base 48, as may be seen best in FIG. 2.

The slight taper of the cover 22 also enhances versatility and ease of use. Covers 22 may be made available in different nominal diameters to accommodate differing bolt sizes, for example 1¼, 1⅜, or 1½ inch diameter. In the event that a bolt 16 projects upward from the tower base 10 by less than the typically expected 12½ to 14½ inches, however, a cover 22 of a smaller nominal diameter may be employed without sacrificing functionality or requiring any special procedures. The diameter 62 of a circle tangent to the edges 50 at the lower ends 58 of the ribs 34 in a nominally smaller cover 22 may be comparable to the diameter 62 of a circle tangent to the edges 50 at the upper ends 60 of the ribs 34 in a next larger size cover 22, resulting in a fit of comparable tightness and security for a smaller cover 22 used on a shorter bolt 16.

A lower region 64 of the upper portion 26 of the cover 22 may not have ribs 34, to facilitate placing and centering the cover 22 on the bolt 16 before force is applied to move it into place.

The bolt cover 22 may easily be installed by being hammered into position to ensure a tight fit. For this reason the upper end member 30 of the cover 22 is preferably joined to the wall 44 through a substantial fillet 66 to ensure strength adequate to transfer the force of hammering without failing. The thickness 68 of the upper end member 30 may also be somewhat greater than the thickness 46 of the wall 44 to withstand the blows.

The bell shaped connecting portion 28 of the lower portion 24 sheds water well and transfers the downward force from the wall 44 in the cylindrical upper portion 26 to the wall 44 in a cylindrical part 70 of the lower portion 24 with less flexing and stress concentration, and consequently offers greater durability than, for example, a flat annular connecting portion between the smaller diameter upper portion 26 and the larger diameter cylindrical part 70 of the lower portion 24.

The lower portion 24 preferably has a flared flange 72 with a flat, annular, bottom surface 74 to form and maintain a weathertight seal with the flat upper surface of the base 10. Because the cover 22 is made of a resilient material, such as polypropylene, this flange 72 can flex outward slightly in response to downward pressure. When the cover 22 is driven fully into position, the ribs 34 are forced down over the bolt 16 slightly farther than necessary to bring the annular bottom surface 74 of the flange 72 into contact with the base 10. This exerts a downward pressure on the lower portion 24, compressing the bell shaped portion 28, causing the flange 72 to flex elastically, and causing the surface 74 to continue to exert pressure on the base 10, as a result of the resiliency of the material. The cover 22 is thus able to form a seal against the base 10 to keep out moisture and dirt. The flange 72 is also preferably constructed with a wall thickness 76 which is the same as the wall thickness 46 of the rest of the cover 22. However, because it is flared outward, the surface 74 cuts across a diagonal of the flange thickness 76. This causes the surface area of the annular planar surface 74 available to contact the flat upper surface of the tower base 10 to be greater than it would be if the flange 72 were unflared, resulting in an enhanced sealing effect.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A protective cover for a protruding end of an elongate fastener, comprising:

(a) an elongate tubular upper portion having a lower end, a closed upper end, and a wall, said tubular upper portion defining a longitudinal axis, and wherein said wall has a thickness and said closed upper end has a thickness greater than said thickness of said wall, and wherein said closed upper end and said wall are joined to each other by a reinforcing fillet, and said tubular upper portion having a first transverse interior dimension large enough to loosely surround a first portion of an elongate fastener to be protected;

(b) a tubular lower portion including an open bottom end and an open top end interconnected with said lower end of said tubular upper portion in a weathertight manner, said tubular lower portion having a second transverse interior dimension greater than the first transverse interior dimension of said tubular upper portion, and said tubular lower portion being large enough for the lower portion to loosely surround a second portion of said elongate fastener to be protected without contacting said second portion, and said open bottom end including an outwardly flared flange including a planar annular bottom surface; and (c) a plurality of ribs within said tubular upper portion extending parallel with said longitudinal axis and projecting radially inward a predetermined distance from said wall, said ribs tapering radially inward from a broad root portion adjacent an inner surface of said wall to a narrow edge portion spaced radially inward from said inner surface, and said protective cover being constructed as a single piece of molded, resiliently deformable, material.

2. The protective cover of claim 1 wherein said material is a plastic.

3. The protective cover of claim 2 wherein said plastic is polypropylene.

4. The protective cover of claim 1 wherein said tubular lower portion includes a bell-shaped transitional portion extending from said open top end toward said open bottom end.

5. In association with a tower having an exposed flat base surface, a combination comprising:

(a) an elongate threaded rod extending from said base surface and having an exposed length;

(b) a nut threadedly engaged with said rod;

(c) at least one washer surrounding said rod and interposed between said nut and said flat base surface, said nut being tightened so as to hold said washer closely in contact against said flat base surface; and, (d) a protective cover, constructed as a single molded piece of a resiliently deformable material, said cover comprising:

(i) an elongate tubular upper portion having an lower end, a closed upper end, and a wall, said tubular upper portion defining a longitudinal axis, and wherein said wall has a thickness and said closed upper end has a thickness greater than said thickness of said wall, and wherein said closed upper end and said wall are joined to each other by a reinforcing fillet, and said tubular upper portion having a first interior diameter large enough to loosely surround said exposed length of said elongate threaded rod;

(ii) a tubular lower portion including an open bottom end and an open top end interconnected with said lower end of said tubular upper portion in a weathertight manner, said tubular lower portion having a second interior diameter larger than said first interior diameter and the lower portion surrounding said nut and said washer loosely without contacting them, and said open bottom end including an outwardly flared flange including a planar annular bottom surface resting on said flat base surface; and, (iii) a plurality of ribs within said tubular upper portion extending parallel with said longitudinal axis and projecting radially inward from a broad root based on said wall and tapered radially to a narrow edge in an interference fit on said elongate threaded rod.

6. The combination of claim 5 further comprising at least two washers interposed between said nut and said surface.

7. The combination of claim 5 wherein said material is plastic.

8. The combination of claim 7 wherein said plastic is polypropylene.

9. The combination of claim 5 wherein said tubular lower portion includes a bell-shaped transition portion extending from said open top end toward said open bottom end.

10. The combination of claim 5 wherein said tubular lower portion has a wall, said wall having a thickness, and said planar annular surface of said flange having a radial width greater than said thickness.

11. A method of protecting an elongate fastener comprising:

(a) selecting a protective cover having an appropriate diameter from a group of said covers having different sizes, said cover comprising:

(i) an elongate tubular upper portion having an open lower end, a closed upper end, and a wall, said tubular upper portion defining a longitudinal axis, and wherein said wall has a thickness, and said closed upper end has a thickness greater than said thickness of said wall and wherein said closed upper end and said wall are joined to each other by a reinforcing fillet, and said tubular upper portion being large enough to loosely surround a first portion of said elongate fastener;

(ii) a tubular lower portion including an open end and an open top end interconnected with said lower end of said tubular upper portion in a weathertight manner, said tubular lower portion being large enough to loosely surround a second portion of said elongate fastener without contacting said second portion, and said open bottom end including an outwardly flared flange including a planar annular bottom surface; and (iii) a plurality of ribs within said tubular upper portion extending parallel with said longitudinal axis and projecting radially inward from said wall, said ribs tapering radially inward from a broad root portion adjacent an inner surface of said wall to a narrow edge portion spaced radially inward from said inner surface, and said protective cover being constructed as a single piece of molded, resiliently deformable, material;

(b) securing said protective cover over said elongate fastener in a weathertight fashion by (i) placing said cover on said elongate fastener so that said elongate fastener extends into said open bottom end; and (ii) driving said cover forcefully onto said elongate fastener so that said elongate fastener is caused to enter the cover, extending into said tubular upper portion and causing said ribs to form an interference fit with said elongate fastener.

12. The method of claim 11, wherein said fastener is an elongate threaded rod.

13. The method of claim 11, wherein said second portion of said elongate fastener includes a nut and at least one washer.

14. The method of claim 11, wherein said second portion of said elongate fastener includes a nut and at least two washers.

15. The method of claim 11 including the further step of coating the elongate fastener with a corrosion-inhibiting substance before placing said protective cover on said elongate fastener.

16. The method of claim 11 wherein said step of driving said cover includes forcing said annular surface into contact with a base surface associated with said elongate fastener.

17. The method of claim 11 wherein said step of driving said cover includes driving said cover far enough along said elongate fastener that said outwardly flared flange is elastically deformed by contact with said base surface and said planar annular surface is urged into contact with said base surface by the elastic force of said flange.

* * * * *